Patented Jan. 3, 1950

2,493,262

UNITED STATES PATENT OFFICE 2,493,262

PROCESS OF PREPARING BASIC SALT COMPOSITIONS

John A. Porvasnik, Westlake, Ohio, assignor to The Harshaw Chemical Company, Elyria, Ohio, a corporation of Ohio No Drawing. Application August 24, 1944, Serial No. 551,069

2 Claims. (Cl. 23—92)

This invention relates to manufacture of basic cupric salts and complexes of high basicity and more specifically to the utilization of cuprous oxide as a source of copper for increasing the basicity of such compounds and complexes.

It is known that basic cupric salts containing more than three $Cu(OH)_2$ groups for each $CuSO_4$ or similar group can be produced by first producing a suspension of a basic copper salt in ammoniacal medium on the alkaline side and blowing the reaction mixture with air in the presence of metallic copper. Metallic copper, however, is not always readily attainable in the form of clean scrap wire or the like suitable for such a process and it dissolves with some difficulty, especially when in relatively massive state. It is, therefore, desirable to be able to utilize a readily available, cheap copper compound which will react more readily than metallic copper and will nevertheless produce copper salts and complexes of the desirable high basicity.

I have now discovered that the desired result can be accomplished by utilizing any of various copper compounds in the preparation of the initial suspension of basic cupric salt in ammoniacal medium and then increasing the basicity of the suspended basic cupric salt by reaction with cuprous oxide in the presence of air in ammoniacal medium. Attempts to produce the same result with cupric oxide were not successful. Under the conditions noted, cuprous oxide has the unique property of, so to speak, adding cupric hydroxide to the basic cupric salt suspension. From the fact that the formula for, e. g., tri-basic cupric sulfate, is frequently written, $CuSO_4 \cdot 3Cu(OH)_2$ or $4CuO \cdot SO_3 \cdot 3H_2O$ or in some similar fashion indicating cupric copper, it might be supposed that cupric oxide would be suitable for direct hydrating and addition to, e. g. the tri-basic compound to form compounds of higher basicity as $CuSO_4 \cdot 5Cu(OH)_2$, but the reactions apparently are complex so that in practice the logical cupric oxide proves unsuitable and the use of cuprous oxide unexpectedly proves to be highly practical.

My novel process may be realized in several variant forms. For the sake of simplicity, I will describe a few representative embodiments in a general way and then indicate the range of possible variations and finally illustrate the invention by specific examples containing quantitative data.

When the desired product is a highly basic copper salt, such as $CuSO_4 \cdot 4Cu(OH)_2$ or $CuCl_2 \cdot 4Cu(OH)_2$ I first form what I call an initial suspension containing a basic salt of lesser basicity than the final product desired and then increase the basicity of the basic salt by the use of cuprous oxide and air or other oxygen-containing gas while maintaining the pH on the alkaline side, preferably between 7.5 and 11.0. Thus, the process consists in two parts, viz., (1) forming the initial suspension of basic salt, and (2) increasing the basicity of the suspended basic salt. The formation of the initial suspension of basic cupric sulfate or chloride or nitrate may be accomplished by known methods using any of various sources of copper, although there are practical advantages in using cuprous oxide as the source of copper. Some very practical sources of cuprous oxide which can be used in my process are available in the form of mill scales, sludges and residues, and these can be used in both parts of the process quite economically. The initial suspension may be made by dissolving in water a normal or neutral copper salt, such as the sulfate, chloride or nitrate, and precipitating a basic salt, by adding ammonia thereto or ammonia and an alkali. Such a precipitate could be expected to be from di-basic to tri-basic. Again, the initial suspension can be produced by contacting an acid solution with air and copper metal or with cupric oxide, or air and cuprous oxide, and adding ammonia thereto in each case. These are but examples and any known method of producing a basic copper salt suspension in alkaline, ammoniacal medium may be employed.

Mixed compositions such as indicated by the empirical formulae:

$½CuSO_4 \cdot ½CuCl_2 \cdot 4Cu(OH)_2$ $½CuSO_4 \cdot ¼CuCl_2 \cdot ¼Cu(NO_3)_2 \cdot 4Cu(OH)_2$ $¾CuSO_4 \cdot ¼CuCl_2 \cdot 5Cu(OH)_2$ $½CuSO_4 \cdot ½CuCl_2 \cdot 5Cu(OH)_2$ and even more highly basic compositions can be produced by starting with suitable proportions of the sulfate, chloride and nitrate of copper. (Wherever a formula is given herein, such as CuCl₂·4Cu(OH)₂, it is not intended thereby to indicate the existence of definite compounds or arrangements of atoms in the molecule, but merely the analytical findings.)

I may also supply the anion or anions by starting with aqueous solutions of sulfuric acid or hydrochloric acid or nitric acid or mixtures of two or more thereof and reacting such acids with copper metal or a copper compound, such as cupric oxide or cuprous oxide, preferably blowing with air to accelerate the reaction and adding ammonia to alkalinity, preferably to a pH value from 7.5 to 11.0.

Mixed final compositions, such as indicated by the empirical formulae:

½ZnSO₄·½CuSO₄·2Cu(OH)₂·2Zn(OH)₂

¼ZnSO₄·¼ZnCl₂·¼CuSO₄·¼CuCl₂·2Cu(OH)₂·2Zn(OH)₂

¼Al₂(SO₄)₃·½CuCl₂·2Cu(OH)₂·2Al(OH)₃ and similar compositions of even higher basicity may be produced by employing suitable salts in proper proportions in the initial ammoniacal suspension whether they be derived from normal salts dissolved and precipitated, or suitable acids reacted with metals or metal compounds, such as oxides and precipitated.

In all the cases mentioned foregoing the objective is the production of a suspension of a basic salt of copper or another metal which forms basic salts capable of absorbing ammonia or a mixture of such basic salts in aqueous, alkaline, ammoniacal medium. After such suspension is formed by any of the procedures indicated above or in any other manner known to persons skilled in the art, I proceed to contact the suspension with finely divided cuprous oxide (Cu₂O) and an oxygen-containing gas whereby to increase the basicity with respect to copper. I preferably employ air and violent agitation. It is possible to add all the cuprous oxide at one time or to add it in portions. Again, according to a special preferred mode of practicing the invention, I may start with a quantity of suspended basic salt or salts in alkaline, ammoniacal medium, contact the same with a portion of cuprous oxide and air or other oxygen-containing gas or gas mixture with agitation until the cuprous oxide has been used up and a desired basicity of the suspended material has been attained, then add an anion other than hydroxyl, suitably sulfate, chloride or nitrate ion or ions (as acid, e. g., HCl or H₂SO₄, or as metallic salt capable of liberating the desired ion or ions, e. g., ZnSO₄) and another portion of cuprous oxide and continue to agitate with air or other oxygen-containing gas. Such additions of anions must not be enough at one time to carry the pH of the reaction mixture to neutrality but repeated additions of anions and cuprous oxide may be made. Such additions may continue until the slurry is too thick for proper agitation or the air or other oxygen-containing gas has carried out too much ammonia. This alternation gives flexibility in operation and provides for any corrections requisite to the production of a uniform product. The slurry is finally washed, filtered and dried.

It is not intended to suggest by the use of empirical formulae that simple proportion relations on the molecular basis must be maintained. All sorts of intermediate proportions and gradations are possible and are perfectly satisfactory. That is, the above indicated anions may be mixed in many proportions and the metals likewise. The desired degree of basicity usually will be such as I call tetra-basic or penta-basic, by which I mean that the analysis would correspond to such a formula as ½CuSO₄·½CuCl₂·4Cu(OH)₂ or ½ZnCl₂·½CuSO₄·5Cu(OH)₂, but I can make them more basic if desired, e. g., I have made up to deca-basic compositions by my novel process. (See Example II.) The degree of basicity is likewise not necessarily an even integer but may come out at any intermediate fractional value, depending upon the time and conditions of treatment with Cu₂O and oxygen-containing gas.

Sometimes the cuprous oxide employed as the source of copper will contain some metallic copper and some methods of preparing the initial suspension will result in the inclusion therein of finely divided metallic copper. For example, if a cuprous oxide which contains metallic copper is treated with acid, the metallic copper present or formed may not be entirely dissolved depending on the amount of oxidation. In any such case, there will be finely divided metallic copper carried into the second part of the process, that is, the part in which the basicity is increased. If such copper is finely divided, as may be expected always to be the case, it will react fairly readily and give the same result as the cuprous oxide without unduly slowing down the process.

Soluble alkali metal chlorides or sulfates may also be present, such as those of sodium, potassium, etc., without affecting or addition to the final product, excepting that a certain proportion of each anion of these salts will appear in the product.

Metallic ions such as calcium or barium forming insoluble sulfates when added to a slurry containing sulfate will merely be co-precipitated as such with the product and will act as a diluent, their precipitation, of course, removing some sulfate with substitution of a greater proportion of halide or nitrate in the copper compound that is later produced.

Inert materials and various impurities may be present without affecting the reaction unduly but unless soluble will act as diluents in the final product.

While I prefer to use ammonia liquor or aqueous ammonia, the use of gaseous or liquid ammonia by introducing them into the solution will give the same result. A further method might be the use of caustic alkali and an ammonia salt which would liberate ammonia.

While I prefer to use air as a source of oxygen, oxygen or any gases containing free oxygen may be substituted without affecting the principle of the discovery.

While I find that a suitable temperature for carrying out the reaction is in the range of 15° C. to 35° C., particularly because of the influence temperature has on the physical properties of the copper compound, the reaction will proceed at other temperatures both higher and lower.

According to the preferred practice of the invention, the process may be carried out in the following steps:

(1) (a) A solution containing one or more suitable metallic sulfates or chlorides, such as the sulfates or chlorides of copper, zinc and aluminum, is prepared by known methods and is held in a suitable reaction vessel or tank.

(b) To this solution which is suitably agitated, aqueous ammonia liquor is added until the pH is between 7.5 and 11.0 and at this point insoluble salts of low basicity of the original metal or metals will be present together with absorbed ammonia and ammonia complexes.

(2) (a) Ground cuprous oxide is added to the slurry and air is blown in from a number of suitably placed jets beneath the surface while stirring is maintained. The cuprous oxide by a reaction or a series of reactions of the nature of which I am not certain reacts with the salts of lower basicity already present to form salts of higher basicity.

(b) After the cuprous oxide has been used up, hydrochloric, nitric or sulfuric acid or metallic salts which liberate the same anions as the acids when made alkaline may be added in amount insufficient to lower the alkalinity of the reaction mixture below pH 7.5, then more cuprous oxide may be added with continued agitation and blowing with air, and so on. These alternate additions may be continued indefinitely until other factors such as increasing thickness of the slurry or loss of ammonia through blowing out with air make it desirable to cease.

(c) When convenient, after the desired amount of cuprous oxide then present in the slurry has been hydrated and oxidized and any excess has been separated by decantation or other means, the slurry may be pumped to a filter in which the basic salts are separated from the mother liquor and are ready for washing and drying.

I am not certain of the nature of the complex reactions which may occur in the process. I believe that in all probability the ammonia takes part in the reaction through repeated formation and dissociation of copper-ammonia complexes, which may be regarded as a catalytic action. I do not know whether the oxygen reacts to oxidize cuprous hydroxide or to oxidize a cuprous ammonium salt. At any rate, a shorthand expression of the overall reaction may be written as follows:

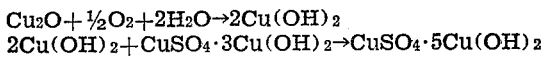

These equations apply only to the simple case where basic copper sulfate is to be increased from tri-basic to penta-basic, but analogous equations for other cases obviously could be written and need not be further exemplified.

If more anions, derived from acids or from metallic salts which liberate suitable anions when made alkaline, are added to the slurry containing the basic copper compounds, there is apparently, due possibly to slight solubility provided by the presence of ammonia or ammonia complexes a reaction between the highly basic particles and the anions which have been added to form compounds of lower basicity. If then more cuprous oxide is added, there occurs seemingly an addition of more $Cu(OH)_2$ to reform a highly basic compound. If the initial solution is not one of copper, but of another metal which also produces hydrates or basic salts capable of absorbing ammonia, or if it is a chloride and say sulfate is later added while maintaining the slurry on the alkaline side, the resulting product is a uniform material in which each particle has the same proportion of the original metal and anion and depending on how long the reaction has progressed on the alkaline side, a lesser or greater amount of copper and of the later added anions, and a lesser or greater basicity. (The term "anion" is used herein in a sense which does not include hydroxyl within its scope.) To describe this further, there seems to be in a slurry of this type a series of compounds formed of slight solubility in the ammoniacal solution which vary only slightly from each other in the degree of their solubility. While the amount of cations and anions may be varied greatly in the solution, the insoluble product which is present at any one time is, disregarding any slight lag in reaction rates, a function of the ratios of the precipitatable metallic ions and the anions, and the pH of the solution. I believe that these complex compounds have separate identities and characteristics and are not merely mixtures of simultaneously precipitated simple basic salts. I believe also that the reaction between anions, from acids or metallic salts which liberate anions when made alkaline, do actually react as I have postulated with the basic copper compounds in a slurry to produce particles of lower basicity which are exceptionally susceptible to a subsequent increase of their basicity by virtue of the addition of copper hydroxide into the molecule.

A feature of my invention which has not been emphasized above is that I may provide the initial suspension using materials other than copper, for example, aluminum or zinc, or a mixture of aluminum and zinc, and then render this suspension more basic by contacting it in aqueous, alkaline, ammoniacal medium with cuprous oxide and an oxygen-containing gas.

Again, according to that phase of the invention in which it becomes desirable to lower the basicity, as pointed out above, I may lower it by adding a salt of a metal other than copper, for example, zinc sulfate or aluminum sulfate, and thereby introduce such other metal into the compound as well as introducing the anions which lower the basicity. This I may do deliberately for the sole purpose of introducing such other metal into the compound in cases wherein it would be otherwise unnecessary to lower the basicity at all.

*Example I*

To a solution of 800 pounds of 66° Bé. sulfuric acid in 1000 gallons of water, 750 pounds of a cupriferous material containing 83.9% cuprous oxide were added with agitation in a suitable tank after which 350 pounds of sodium chloride were added. The result was the formation of a solution of copper chloride-sulfate together with some other soluble metallic salts and impurities and some copper metal and insoluble material from the impurities in the cupriferous material used.

This reaction mixture was agitated with air both before and after the addition of 700 pounds of 26° Bé. ammonium hydroxide. At this point a slurry or suspension of basic metallic salts in an ammoniacal solution had been obtained utilizing both the copper chloride-sulfate solution and the copper metal.

To this slurry, which was violently agitated with air, 900 pounds more of the cuprous oxide containing material was added. This cuprous oxide, according to my theory of the mechanism, was hydrated to cupric hydroxide which in turn added on to the copper compounds already precipitated to eventually become completely converted to basic copper salts. As the slurry was too thick for further addition, the excess ammonia was neutralized and the slurry was filtered, washed and dried. The cake was a light blue basic copper compound of uniform composition. The yield was 2,270 pounds of the basic copper chloride-sulfate composition containing 56.8% Cu and was approximately tetra-basic. This composition was a fluffy material of excellent anti-cryptogamic properties.

Example II

In 3000 cc. of water in a small lead tank were dissolved 200 g. $CuSO_4 \cdot 5H_2O$. To this was added 42 cc. of concentrated HCl. To this with stirring was added at room temperature 190 cc. $NH_4OH$ to pH 8.2. This constitutes the initial ammoniacal suspension of basic salts.

To this was added 300 g. of −60 mesh cuprous oxide, and air was passed in through suitable jets in the bottom of the tank. After several hours, the pH had risen to 8.5, but 40 cc. more $NH_4OH$ were added to increase the alkalinity up to the desired point of pH 9.4.

After several hours the slurry became very thick and was drawn off, filtered, washed and dried.

The copper content of the final copper compound was 51.40%, and the compound was 10 basic.

Example III 300 g. of $ZnSO_4 \cdot 6H_2O$ was dissolved in 3000 cc. of water in a small lead tank. To this was added 10 cc. of conc. HCl. 26° Bé. ammonium hydroxide was added to pH 8.2, 155 cc. being required. This formed the ammoniacal suspension of basic salts, and no copper was introduced up to this point.

To this suspension was added 300 g. of −60 mesh cuprous oxide and the slurry was blown with air. The air rate was a little high and some ammonia was lost necessitating the addition during the run of 25 cc. more ammonia to adjust the final pH to 9.1.

After several hours, the slurry thickened and was decanted from the small amount of cuprous oxide remaining. The slurry was filtered and the basic copper compound washed and dried.

The copper compound contained 40.83% Cu, and 11.23% Zn, and was approximately 9.4 basic.

What I claim is:

1. A process of preparing a basic salt composition comprising the steps of preparing a solution containing a salt of the class consisting of the sulfates and chlorides of copper, zinc and aluminum, adding with agitation sufficient aqueous ammonia to render said solution alkaline and form a slurry and contacting the resulting slurry with cuprous oxide and an oxygen containing gas.

2. A process of preparing a basic salt composition comprising the steps of preparing a solution containing a salt of the class consisting of the sulfates and chlorides of copper, zinc and aluminum, adding aqueous ammonia to said solution with agitation until the pH is between 7.5 and 11.0 and contacting the resulting slurry with cuprous oxide and an oxygen containing gas.

JOHN A. PORVASNIK.

REFERENCES CITED

The following references are of record in the file of this patent:

UNITED STATES PATENTS

| Number | Name | Date |
|---|---|---|
| 1,938,608 | Osborn et al. | Dec. 12, 1933 |
| 2,104,754 | Marsh et al. | Jan. 11, 1938 |

OTHER REFERENCES

Thorpe, "Dictionary of Applied Chemistry," (4th edition 1939), vol. III, pp. 354 and 355.

Mellor, "Comprehensive Treatise on Inorganic and Theoretical Chemistry," vol. 3, Longmans Green & Co., N. Y., 1923, pp. 124 and 128.

Peters, "Principles of Copper Smelting," Hill Publishing Co. (1907), page 490.

Hofman, "Metallurgy of Copper," McGraw Hill (N. Y.), 1924, p. 16.